April 21, 1931.                J. KUBLER                1,801,868
                           TRANSFORMER APPARATUS
                           Filed Aug. 24, 1927            2 Sheets-Sheet 1

Witness:                                    Inventor
R. Burkhardt                             Johannes Kubler,
                                    By Cromwell, Greist & Warden
                                                        attys.

April 21, 1931. J. KUBLER 1,801,868
TRANSFORMER APPARATUS
Filed Aug. 24, 1927 2 Sheets-Sheet 2

Witness:
G. Burkhardt

Inventor:
Johannes Kubler,
By Cromwell, Greist & Warden
attys.

Patented Apr. 21, 1931

1,801,868

UNITED STATES PATENT OFFICE

JOHANNES KUBLER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

TRANSFORMER APPARATUS

Application filed August 24, 1927, Serial No. 215,246, and in Germany August 28, 1926.

This invention relates to transformer apparatus and has particular relation to transformer apparatus used in combination with triple-phase rectifiers for converting quarter-phase currents into direct current.

Among the objects of the invention is an improved transformer of the foregoing character and its combination with a rectifier characterized by an arrangement of the transformer winding which secures balanced current and the voltage conditions, permits establishment of a neutral point of predetermined potential in the quarter-phase system and secures efficiency of operation with economy of material and space.

The foregoing, and other objects of the invention, will be best understood from the following descriptions of exemplification thereof, reference being had to the accompanying drawings wherein Fig. 1 is a circuit diagram illustrating the combination of a rectifier with a transformer embodying the invention.

Figure 1:
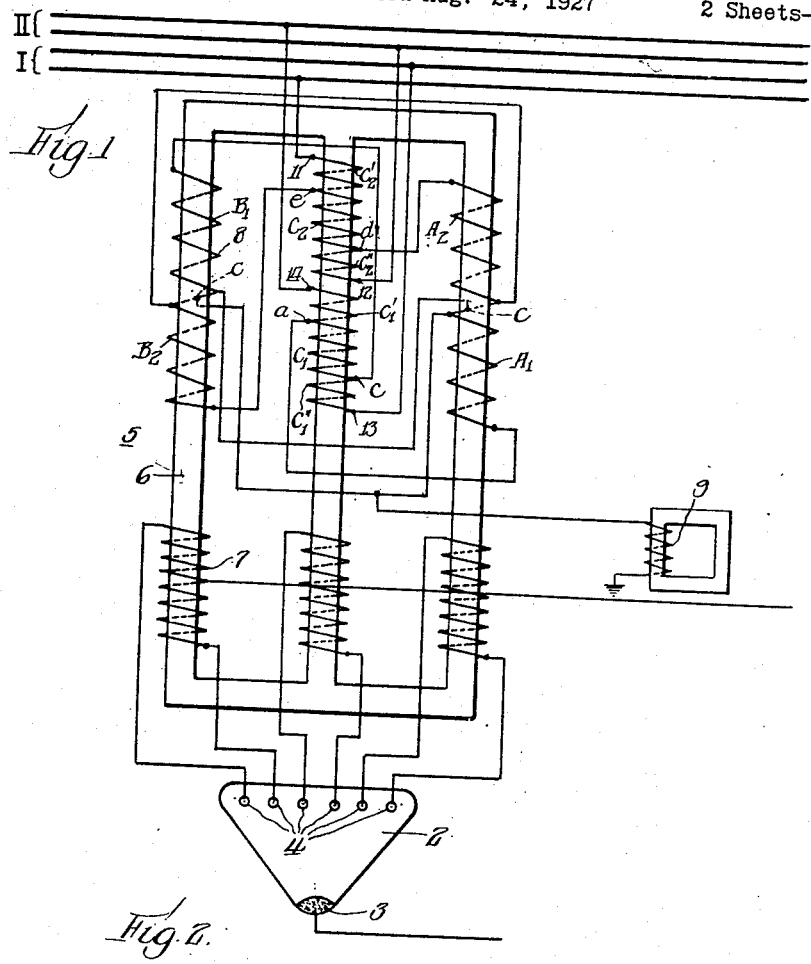

For the conversion of quarter-phase current into direct current in large power installations, it is desirable to use mercury-vapor rectifiers of the triple-phase type, that is, either three phases or a multiple thereof. To secure satisfactory operation at a minimum cost it is important that the transformer apparatus for supplying such rectifier shall be perfectly balanced and symmetrical, both with respect to the triple-phase current flowing to the rectifier, as well as with respect to the quarter-phase currents flowing from the line.

One of the features of the invention is the provision of an improved winding system particularly suitable for use in transformers of the foregoing type for converting quarter-phase current into triple-phase current and adapted to serve also as a means for establishing a neutral tapping point for quarter-phase systems. Such neutral tapping point is ordinarily not present in two-phase alternating-current systems because they usually operate either with four-wire systems, having two independent phases or with three-wire systems in which an end of one phase is joined to an end of the other phase. Both types of connections are unsuitable when the two-phase network has to supply apparatus or windings having interlinkage points that have no corresponding points in the network. For instance, when rectifiers are to be operated, as explained above, it is necessary to have a star or junction point which corresponds to the neutral point of the system under conditions of symmetry. If the rectifier has three anode-phases it will be necessary to supply the same from a two-phase to three-phase transformer, the primary winding of which may, in a given case, be so interconnected that the junction point of the phases is the neutral point of the system.

Such load cannot be connected to a two-phase three-wire system since it would constitute a short circuit on the system. A four-wire quarter-phase system with non-interlinked phases will also operate unsatisfactorily on such load if the symmetry should in any way become disturbed. For example, if the line conductors have different partial capacities to ground or different insulation resistance, the natural position of the neutral point of the network, whose potential difference with respect to the ground is zero, will not coincide with the neutral point of the load. Under such conditions there will take place a flow of equalizing currents if the winding arrangement of the load is such as to bring about coincidence of these two points. Such equalizing currents may assume very high values and represent a very undesirable load, both on the network and on the load apparatus thereof.

One feature of the present invention resides in the adaptation of a two-phase supply system for connection to apparatus that interlinks the network in the neutral point of the system by providing on said system a neutral point and grounding the same. This absolutely prevents any displacement of the neutral point of the network and definitely fixes the relative potentials of the system. As such neutral point may be used, either the neutral point of the winding of a generator or load apparatus that operates on the system, or the neutral point may be obtained by means of a special winding connected to the system and having a neutral tapping connection thereon. The equalizing connection will be most effective with the neutral point directly connected to the ground. However, this has the disadvantage that in case of a short circuit automatic disconnection of the network is required. To avoid these difficulties the neutral point may be grounded either through a resistance or through reactors, preferably through an inductance arranged so as to compensate the current tending to flow to a ground fault as explained in the periodical of Brown Boveri & Cie. entitled "BBC Mitteilungen" of May 1921, p. 71. etc.

In order that the current flowing in the grounding connection shall not be impeded by the action of the equalizing windings, a neutral-point tapping transformer may be used for this purpose. Such transformer is similar in nature to a static balancer having windings distributed on a magnetic core having two or more phases or core legs. If a two-phase design is adopted, the neutral tapping transformer is arranged with two core legs and two phase windings mounted thereon. If a three-phase construction is adopted, the transformer comprises a three-phase winding on three core legs, the number of turns being so chosen and the connections being so made as to give tapping points for operating on a two-phase system and also a junction point corresponding to the neutral point of the two-phase system.

Figure 2:
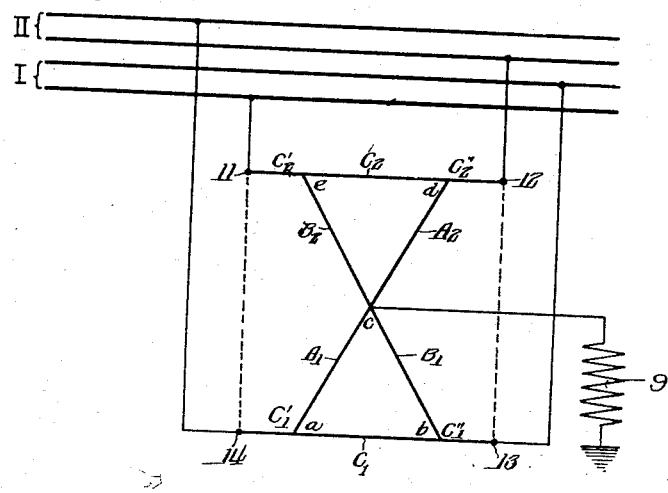
Fig. 2 is a vector diagram illustrating the phase relationship and the winding connections of the primary winding of the transformer of Fig. 1.

A transformer and winding arrangement which embodies the features of the invention pointed out above is shown by way of example in Figs. 1 and 2 illustrating an organization wherein a two-phase supply line I, II is arranged to supply balanced alternating current to a six-phase mercury-vapor rectifier 2, having a cathode 3 and six anodes 4. In order to transform the quarter-phase currents of the supply line I, II into six-phase currents for the rectifier 2, I utilize a special transformer 5 comprising a three-phase core 6, having three core legs. Mounted on said transformer core 6 is a six-phase star-connected secondary winding 7 having its end terminals connected to the anodes 4 of the rectifier and a primary winding 8 arranged so as to maintain balanced current and voltage condition, both in the three-phase connections to the rectifier, as well as in the quarter-phase connections to the supply line I, II. The primary winding 8 is so arranged as to also provide a neutral tapping point for the quarter-phase system for connecting a grounding device such as an inductance coil 9 thereto, thereby fixing the voltage relations of the system.

As seen from Fig. 2 in which the various elements of the primary winding 8 are represented by the vectors of the voltages induced therein, respectively, said winding comprises two sets of winding sections $A_1$, $B_1$, $C_1$ and $A_2$, $B_2$, $C_2$, the voltage vectors of which constitute two symmetrically disposed equilateral triangles, $a$, $b$, $c$ and $c$, $d$, $e$, with a common junction point at $c$ constituting the neutral point of the system. In other words, the winding sections $A_1$, $A_2$ belonging to one phase and the winding sections $B_1$, $B_2$ belonging to the other phase, and arranged respectively on two different phases or legs of the core, are of equal length and enclose a phase angle of 60° and 120°, respectively, the voltage vectors representing said windings, crossing each other in the form of an X, the windings being joined at the point corresponding to the intersection of said vectors. The co-phasal winding sections $C_1$, $C_2$ which join the end points of the two pairs of said X-connected winding sections $A_1$, $A_2$ and $B_1$, $B_2$ are disposed on the third phase or leg of the transformer core and have co-phasal extensions $C'_1$ $C''_1$, $C'_2$, $C''_2$ so that the corresponding voltage vectors define a square, the four corners of which constitute terminals 11, 12, 13, 14 for connection to a two-phase system, the two-line phases I, II being connected to said terminals.

A winding arrangement of this character will readily serve as a means for defining the potential of the system with respect to the ground by providing a grounding connection to the neutral tapping point $c$, for instance, in the form of the inductance coil 9 referred to above. Such winding is also suitable for operation in conjunction with the secondary supply winding 7 for transforming the quarter-phase current from the supply line I, II into balanced triple-phase currents for supplying three-phase rectifiers, or in general, rectifiers having a multiple or three-phases. With such arrangement, balanced voltage, current and flux conditions will be maintained, both with respect to the three-phase system, as well as with respect to the two-phase system, and balanced three-phase flux fluctuations will obtain in the transformer core 6.

In many cases, the slight dissimilarity between the X-connected phase windings $A_1$, $A_2$, $B_1$, $B_2$ and the phase windnigs $C_1$, $C'_1$, $C''_1$, $C_2$, $C'_2$, $C''_2$ joining the end terminals of the X-connected windings may be the cause of slight unbalance in the voltage and current conditions of the rectifier system and one of the objects of the invention is to so combine organizations of the foregoing character as to reduce the resulting unbalance to a minimum and substantially eliminate the same. According to the invention, these unbalances are compensated for by utilizing two transformer organizations of the above described character and so interconnecting the same to the supply system that any unbalance that may be caused by one of said transformers is neutralized or compensated for by the other. In the preferred arrangement this is secured by changing in cyclic rotation the sequence of connections of quarter-phase terminals of one of said transformers with respect to the other of said transformers.

Figure 3:
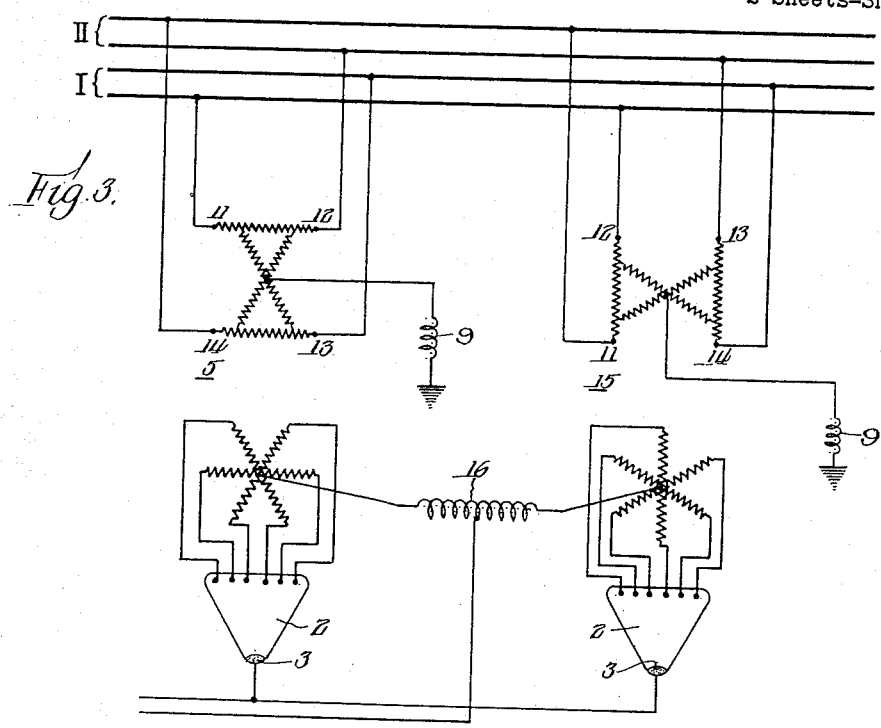
Fig. 3 is a circuit diagram illustrating a rectifier system wherein two transformer units of the type shown in Fig. 1 are combined to mutually compensate unsymmetries of the individual units.

This is clearly shown in Fig. 3 illustrating a rectifier installation comprising two six-phase rectifiers 2, such as illustrated in Fig. 1 supplied from transformers 5 and 15, respectively, transformer 15 being constructed like the transformer 5 illustrated in detail and described in connection with Figs. 1 and 2. In order to secure the compensating effect as described above, the primary windings of the transformer 5 have the quarter-phase terminals 11, 13 and 12, 14 connected to the quarter-phase supply lines I, II while the corresponding connections of the phase terminals of the second transformer 15 are cyclically rotated 90°, that is, phase terminals 11, 13 are connected to phase II and phase terminals 12, 14 are connected to phase I. As a result of the foregoing connections of the primary transformer windings, there will be a phase displacement of 30° between the phases of the secondary windings of the two transformers. In the preferred arrangement, according to the invention, the secondary windings of the two transformers are interlinked by an interphase or absorption coil 16, to the midpoint of which is connected one of the direct current leads, the other direct current lead being connected to the two cathodes 3 of the rectifier.

Figure 4:
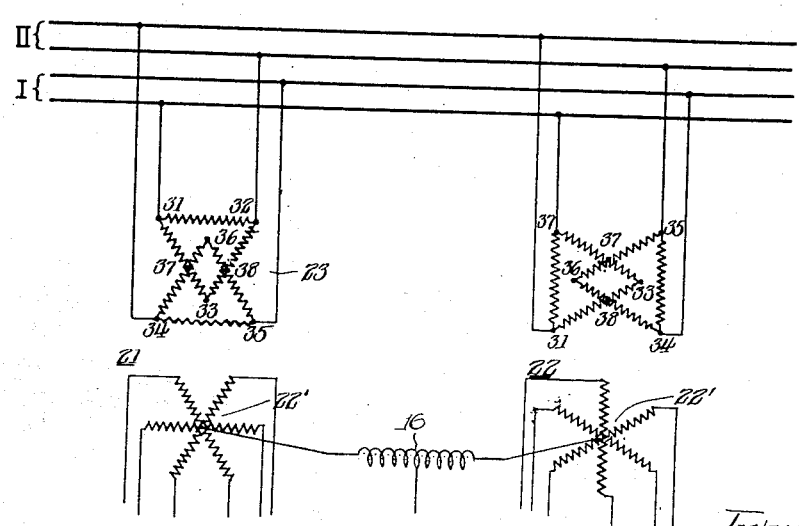
Fig. 4 is a circuit diagram of a system similar to Fig. 3 utilizing a different form of transformer.

By utilizing an arrangement of the foregoing character with the absorption coil interlinking the two transformers, the currents in the two rectifiers will be caused to overlap and the higher harmonics tending to flow in the system will be suppressed. In addition, the arrangement will neutralize any unbalance that may result from differences in the two systems and render the whole combination more symmetrical. The suppression or elimination of electrical or magnetical unbalance in transformers or rectifier systems of the foregoing character is not confined to transformers utilizing X-connected winding systems as shown in Figs. 1 and 2 but is also applicable to other types of transformers for converting quarter-phase currents into three-phase currents, or a multiple thereof. In Fig. 4 is shown a rectifier system showing the invention as applied to an organization utilizing a different type of transformer than that of Fig. 3. In the arrangement of Fig. 4 the two six-phase rectifiers 2 are supplied from two transformers 21 and 22, respectively. Each transformer has a six-phase star-connected secondary winding 22' and co-operating therewith a primary winding 23 arranged to induce a balanced three-phase flux for generating in said secondary windings 22' balanced polyphase six-phase currents. Each primary winding 23 is composed of two symmetrical delta-connected phase windings 31, 32, 33, 34, 35, 36. The two delta-connected windings of each transformer are so arranged and interconnected that the voltage vectors corresponding to the phase voltages induced therein constitute two equilateral triangles overlapping each other, with two-co-phasal windings 31—32 and 34—35 constituting two opposite sides of a square, the other voltage vectors falling within the area of the square and intersecting at 37 and 38. The winding phases corresponding to said intersecting vectors are joined at the points corresponding to said points of intersection 37 and 38. Co-phasal winding elements of the two delta-connected winding systems of the primary windings and the corresponding element of the secondary winding 22' are arranged on common phases of a three-phase transformer core. That is, windings 31—32 and 34—35 with the corresponding secondary winding are on one core phase; windings 34—36, 32—33 and the corresponding secondary winding are on the other core phase; and windings 31—33, 35—36 and the corresponding secondary winding are on the third core phase.

A primary winding system as described above is suitable for operation to convert quarter-phase currents into three-phase currents, the quarter-phase supply line I, II being connected to points on the winding corresponding to the corners of the square 31, 32, 34, 35.

As in the arrangement of Fig. 3, any unbalance between the windings of the two systems that may result from the differing degree of utilization of the various winding elements on the different core phases is neutralized or compensated by cyclically changing the connections between the terminals of the two windings to the quarter-phase supply line. Thus, in the transformer 21, the quarter-phase terminals 31, 35 are connected to supply line I and quarter-phase terminals 32, 34 are connected to supply line II; and in transformer 22 the quarter-phase terminals 31, 35 are connected to line phase II and quarter-phase terminals 32, 34 are connected to line phase I. As a result of this interchange of connections in the direction of cyclic phase rotation, the phases of the voltage induced in the secondary windings will be phase displaced by 30°, as in the arrangement of Fig. 3.

The principles of the invention explained in connection with the above described exemplifications of the invention will suggest to those skilled in the art many other forms and modifications thereof, and it is accordingly desired that the appended claims be given a broad construction commensurate with the scope of the invention.

I claim:

1. A neutral tapping transformer comprising a three-phase core, two X-connected phase windings disposed on two different phases of said core, respectively, and two additional phase windings disposed on the third core phase, said additional windings connecting respectively the end terminals of said two X-connected phase windings and having extensions projecting beyond the points of junction with said windings, the number of turns and relationship of said windings being such that the voltage vectors of said two X-connected windings define two equilateral triangles symmetrically disposed on opposite points of the intersection of said two windings, the end points of the voltage vectors of said additional two windings constituting two sides of a square enclosing said intersecting voltage vectors and being symmetrically disposed with respect to said point of intersection, the points of said additional windings corresponding to the corners of said square constituting the quarter-phase terminals of said transformer, the point of intersection of said two X-connected windings constituting a neutral tapping connection.

2. A transformer for transforming quarter-phase currents into $n$-phase currents, or vice versa, $n$ being determined by the equation $n=3.2^x$, comprising an $n$-phase core, a balanced $n$-phase winding arranged on said core for connection to an $n$-phase line, and a quarter-phase winding arranged on said core for connection to a quarter-phase line, said quarter-phase winding comprising two phase-windings enclosing an angle of 60° and having a junction at their midpoints so that the voltage vectors thereof define two equilateral triangles symmetrically disposed on opposite sides of said junction, two additional phase windings of a phase corresponding to the open sides of the triangles formed by said first-mentioned windings and complementing said triangles, said additional phase-windings having co-phasal extensions beyond the points of junction with said X-connected windings, the voltage vectors corresponding to said additional windings defining opposite sides of a square symmetrically enclosing said X-connected windings, the points of said additional windings corresponding to the corners of said square constituting the quarter-phase terminals of said windings, said junction point of said X-connected windings being of neutral potential with respect to said quarter-phase terminals.

3. The combination of a quarter-phase line, a first transformer for transforming quarter-phase current from said line to $n$-phase current, $n$ being determined by the equation $n=3.2^x$, a second transformer similar to the first transformer for transforming quarter-phase current from said line into $n$-phase current, two similar loads supplied respectively from said transformers with $n$-phase currents, said two transformers having similar winding arrangement with two sets of corresponding quarter-phase terminals for connection to said quarter-phase line, the connections of said quarter-phase terminals to the phases of said line being cyclically rotated in said two transformers, and an interphase transformer interconnecting said loads with said secondary windings to interlink the current flow in the secondary windings of said two transformers.

4. The combination of a quarter-phase line, two similar transformers having similar primary windings connected to said line and secondary windings, similar loads supplied respectively by said secondary windings, corresponding pairs of terminals of the primary windings of said two transformers being connected to different phases of said quarter-phase line, and an interphase transformer interconnecting said loads with said secondary windings to interlink the current flow in the secondary windings of said transformers.

5. The combination of a quarter-phase line, a pair of similar transformers having quarter-phase primary windings connected to said line $n$-phase secondary windings, $n$ being determined by the equation $n=3.2^x$, similar $n$-phase loads connected respectively to said secondary windings, corresponding pairs of terminals of said two primary windings being cyclically connected to different phases of said quarter-phase line, and an inter-phase transformer interconnecting said loads with said secondary windings to interlink the current flow in the secondary windings of said two transformers.

6. In transformer apparatus, windings connected to each other intermediate their respective ends to provide a neutral point for said apparatus and being of different phase with respect to each other, a winding connected at points intermediate its ends to the respective adjacent terminals of said first-named windings on one side of said point, said winding being of phase different from the respective phases of said first-named windings, and another winding connected at points intermediate its ends to the respective adjacent terminals of said first-named windings on the other side of said point, said lastnamed winding being of phase different from the respective phases of said first-named windings.

In testimony whereof I have hereunto subscribed my name this 9th day of August, A. D., 1927, at Zurich, Switzerland.

JOHANNES KUBLER.